Feb. 28, 1950  E. H. CAMFIELD  2,498,910
EXHAUST TURBINE AND PUMP
Filed Nov. 21, 1946  2 Sheets-Sheet 1
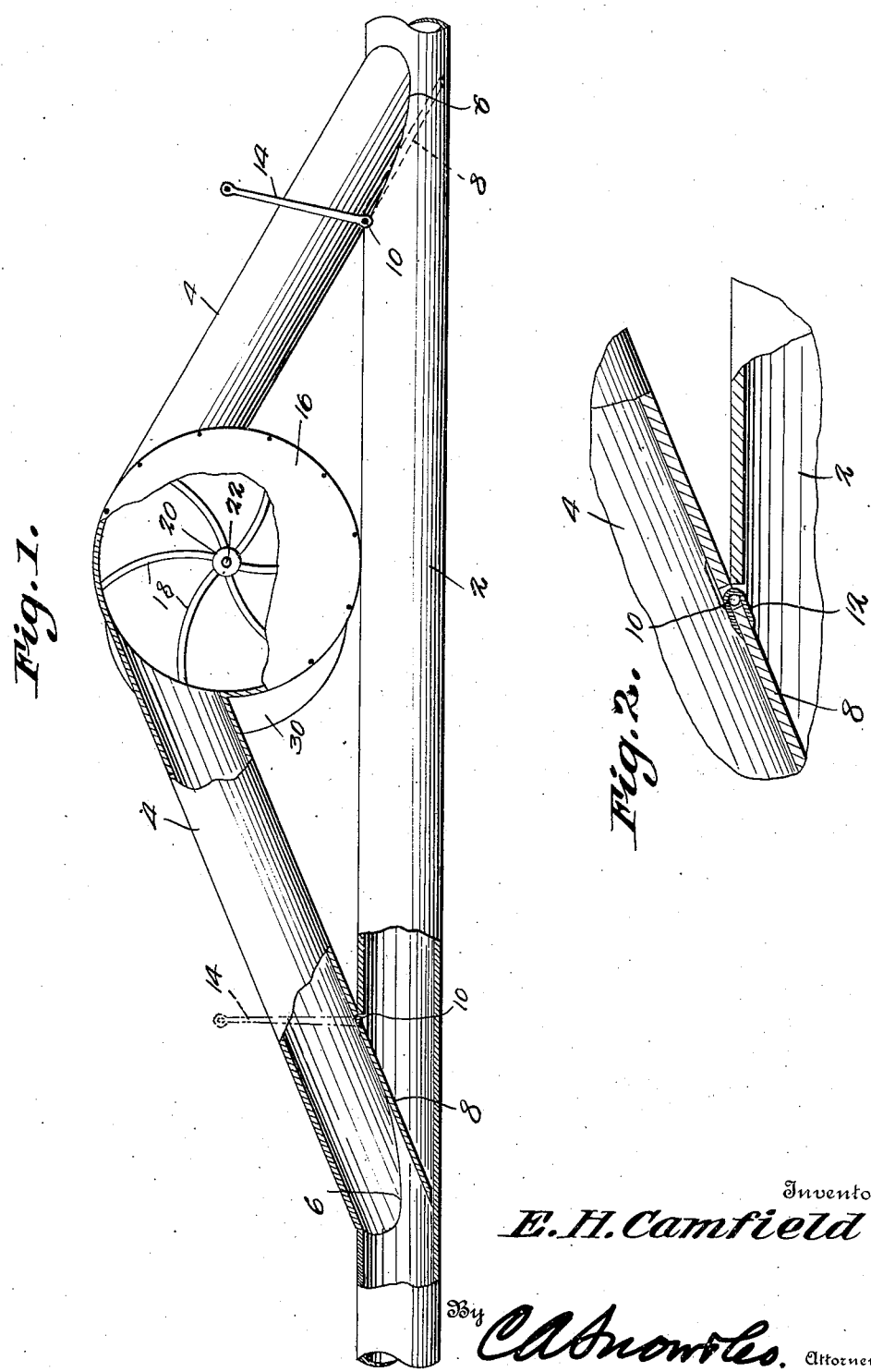
Inventors
E. H. Camfield
By C. A. Knowles, Attorneys Feb. 28, 1950     E. H. CAMFIELD     2,498,910
EXHAUST TURBINE AND PUMP
Filed Nov. 21, 1946     2 Sheets-Sheet 2
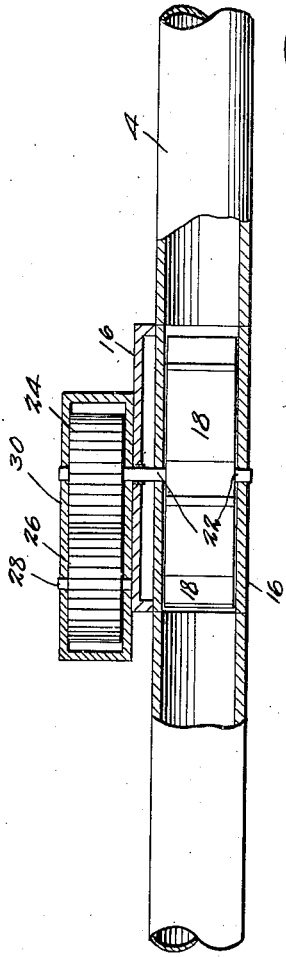
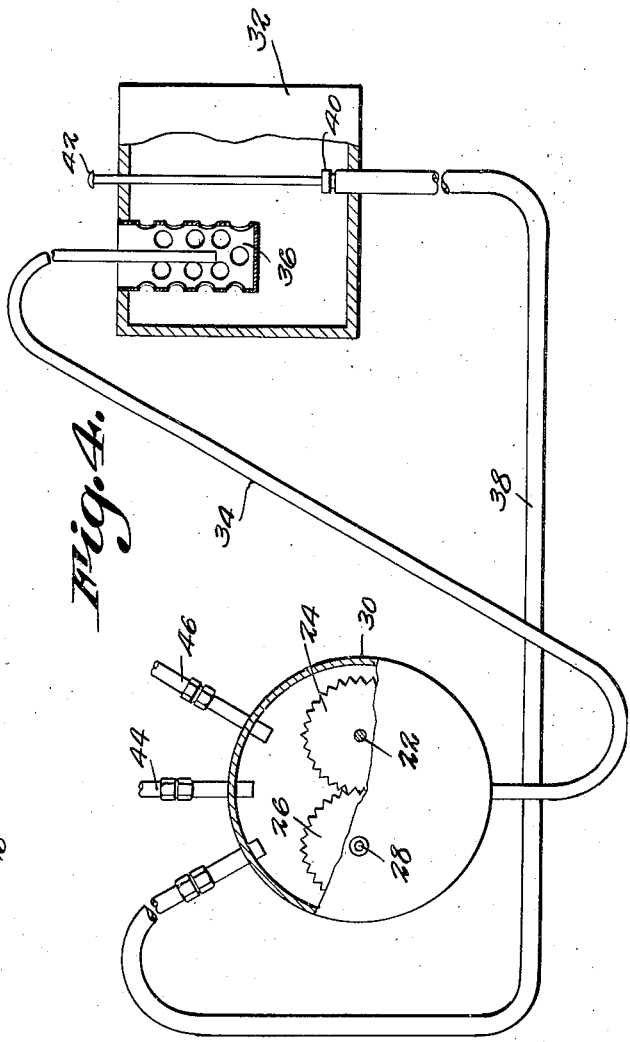
Inventors.
E. H. Camfield
By Knowles, Attorneys.

Patented Feb. 28, 1950

2,498,910

UNITED STATES PATENT OFFICE 2,498,910

EXHAUST TURBINE AND PUMP

Earthen H. Camfield, Florence, Colo.

Application November 21, 1946, Serial No. 711,325

1 Claim. (Cl. 103—118)

My present invention relates to an improved exhaust turbine and pump and more particularly to a turbine operated by the exhaust gases of internal combustion engines used as power sources for automobiles and trucks to operate a fluid pump, which fluid under pressure may be utilized to actuate such devices as power brakes and windshield wiper motors.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a side elevational view partially in section of the device of my invention.

Figure 2 is a detail of the by-pass valve and its pivot.

Figure 3 is a horizontal sectional view through the turbine and pump; and

Figure 4 is a schematic view of the system providing for the flow of fluid to and from the reservoir.

Referring now to the drawings wherein like parts are indicated by like characters I have illustrated the present embodiment of my invention as comprising the conventional engine exhaust pipe 2 having a by-pass pipe 4 fitted thereto as at 6 and sealed as desired to prevent leakage of exhaust gases.

In each fitted connection of the by-pass and exhaust pipe I utilize the valves 8 pivoted at 10 and secured by clamps 12, and the levers 14 permit the movement of the valves to shut off or open the by-pass pipe 4.

Intermediate of the by-pass pipe I employ a turbine housing 16 for the turbine blades 18 secured to the hub 20 on the axle 22. A gear 24 operably mounted on the axle 22 meshes with a second gear 26 on the shaft 28, and the gears are confined within the gear housing 30 adjacent the turbine housing.

A reservoir 32 for the fluid to be pumped by the gear pump is formed with an inlet pipe 34 to the pump having its reservoir terminus in the sump 36. The outlet pipe 38 from the pump to the reservoir is fashioned with a valve 40 for controlling the flow of fluid therethrough, and the valve is actuated and set by the stem 42.

Pipes 44 and 46 from the pump housing convey fluid under pressure to selected and desirable fluid motors on the vehicle, such as for the brakes or the windshield wiper.

From the above description of the construction of the device of my invention it will be apparent that I have utilized the waste exaust gases of the conventional internal combustion engine to produce power through the gear pump whereby other devices on the vehicle may be operated or their power boosted without appreciable loss of power from the engine.

Having thus fully described my invention what I claim as new and desire to secure by Lettters Patent is:

The combination, with an internal combustion engine exhaust pipe, of a by-pass for the pipe, valves respectively mounted at the inlet and outlet ends of the by-pass, manually operable control means for each valve adapted to regulate the intake and the discharge of exhaust gases passing through the by-pass and through the portion of the pipe by-passed thereby, an exhaust-gas-powered turbine in the by-pass, a gear pump connected to the turbine to be driven thereby, a fluid distribution system connected to the pump for operation thereby, and an adjustable valve in said system for controlling the fluid pressure supplied to the system by the pump.

EARTHEN H. CAMFIELD.

REFERENCES CITED

The following references are of record in the file of this patent:

UNITED STATES PATENTS

| Number | Name | Date |
|---|---|---|
| 1,752,224 | Apple | Mar. 25, 1930 |
| 1,992,003 | Cook | Feb. 19, 1935 |
| 2,234,777 | Puffer | Mar. 11, 1941 |
| 2,292,233 | Lysholm | Aug. 4, 1942 |
| 2,386,096 | Ehrling | Oct. 2, 1945 |